J. GEIER.
SURVEYOR'S INSTRUMENT.
APPLICATION FILED SEPT. 8, 1913.

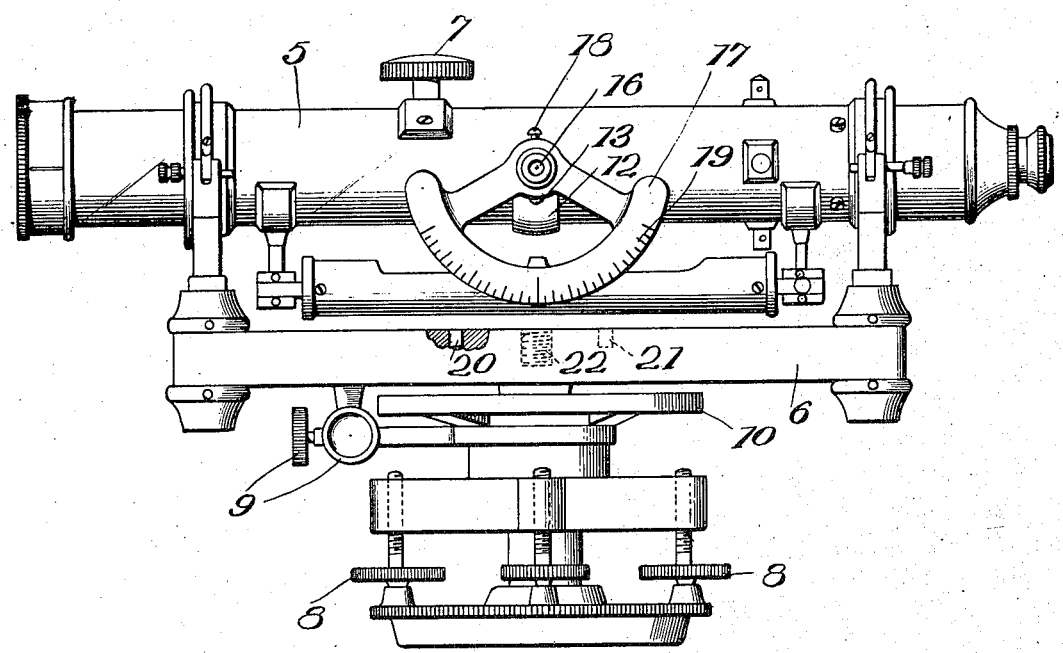
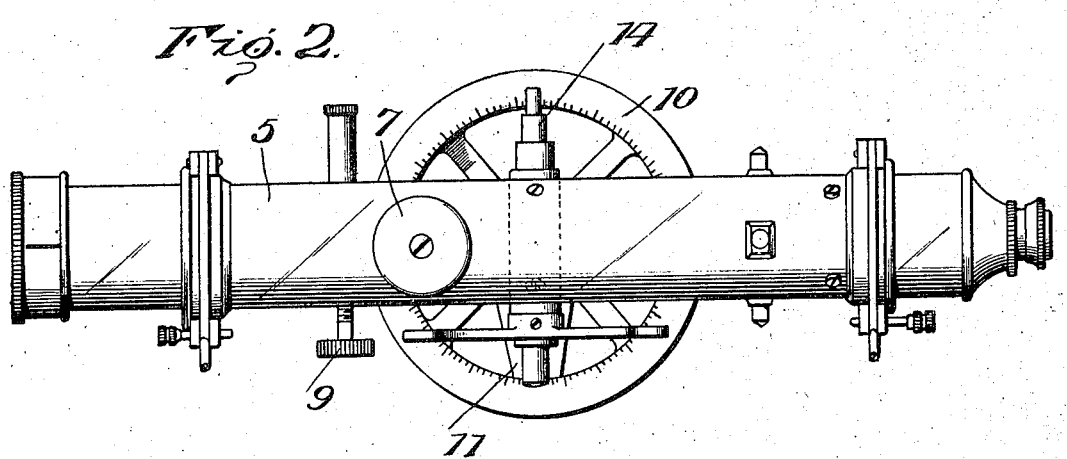

1,133,122.

Patented Mar. 23, 1915.
3 SHEETS—SHEET 2.

Witnesses
N. Abramson
J. R. Pier

Inventor
James Geier

By
Attorney

J. GEIER.
SURVEYOR'S INSTRUMENT.
APPLICATION FILED SEPT. 8, 1913.

1,133,122.

Patented Mar. 23, 1915.
3 SHEETS—SHEET 3.

UNITED STATES PATENT OFFICE.

JAMES GEIER, OF TROY, NEW YORK, ASSIGNOR OF ONE-HALF TO JOSEPH BLUHM, OF TROY, NEW YORK.

SURVEYOR'S INSTRUMENT.

1,133,122.  Specification of Letters Patent.  Patented Mar. 23, 1915.

Application filed September 8, 1913. Serial No. 788,727.

*To all whom it may concern:*

Be it known that I, JAMES GEIER, citizen of the United States, residing at Troy, in the county of Rensselaer and State of New York, have invented certain new and useful Improvements in Surveyors' Instruments; and I do hereby declare the following to be a full, clear, and exact description of the invention such as will enable others skilled in the art to which it appertains to make and use the same, reference being had to the accompanying drawings, and to letters or figures of reference marked thereon, which form a part of this specification.

This invention relates to instruments adapted for use by surveyors, architects, or the like, and more particularly to that class of surveyors' instruments adapted to be used interchangeably.

The object of this invention is to provide a convertible surveyor's instrument, of the character described adapted to be used as a Y level or a transit.

A further object of this invention is to provide an attachment for an ordinary surveyor's Y level by means of which the level may be used as a transit, with a vertical arc, tangent clamp and vernier.

A still further object of this invention is to provide means for determining both the horizontal and vertical angles by the use of the level and its attachment.

With these and other objects in view, this invention consists in the peculiar combination and arrangement of the various detachable members and parts of a combined surveyor's Y level and transit as hereinafter described and more particularly pointed out in the appended claims.

Figure 3:
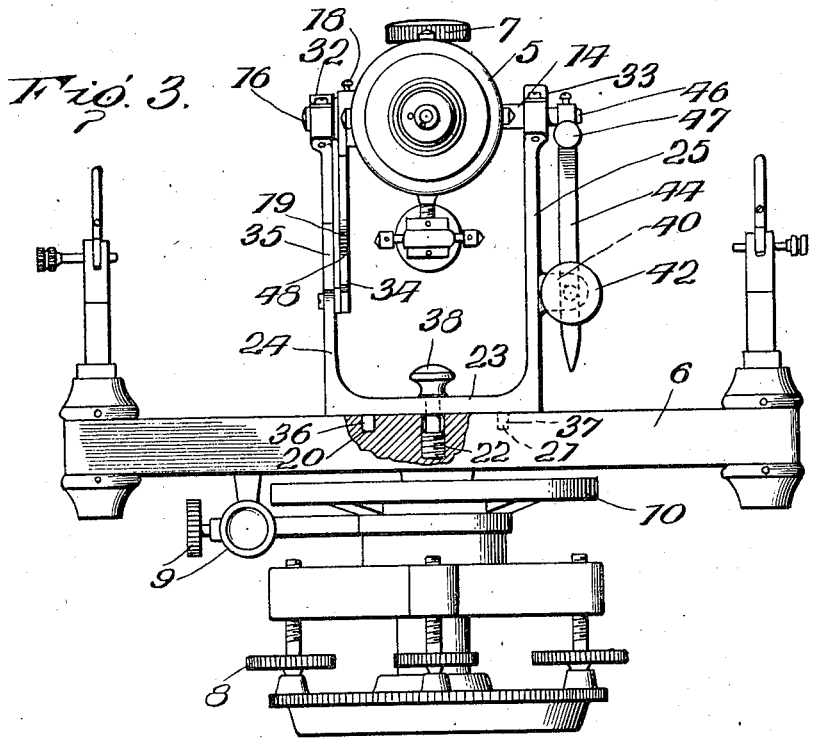
Figure 4:
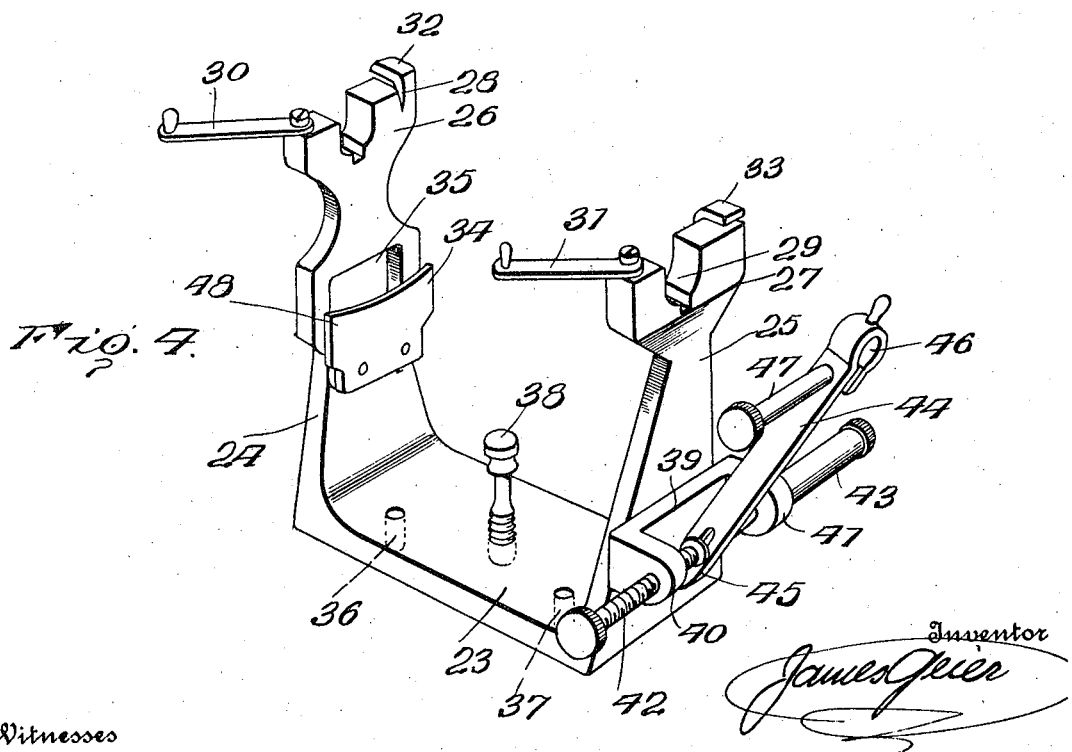
Figure 5:
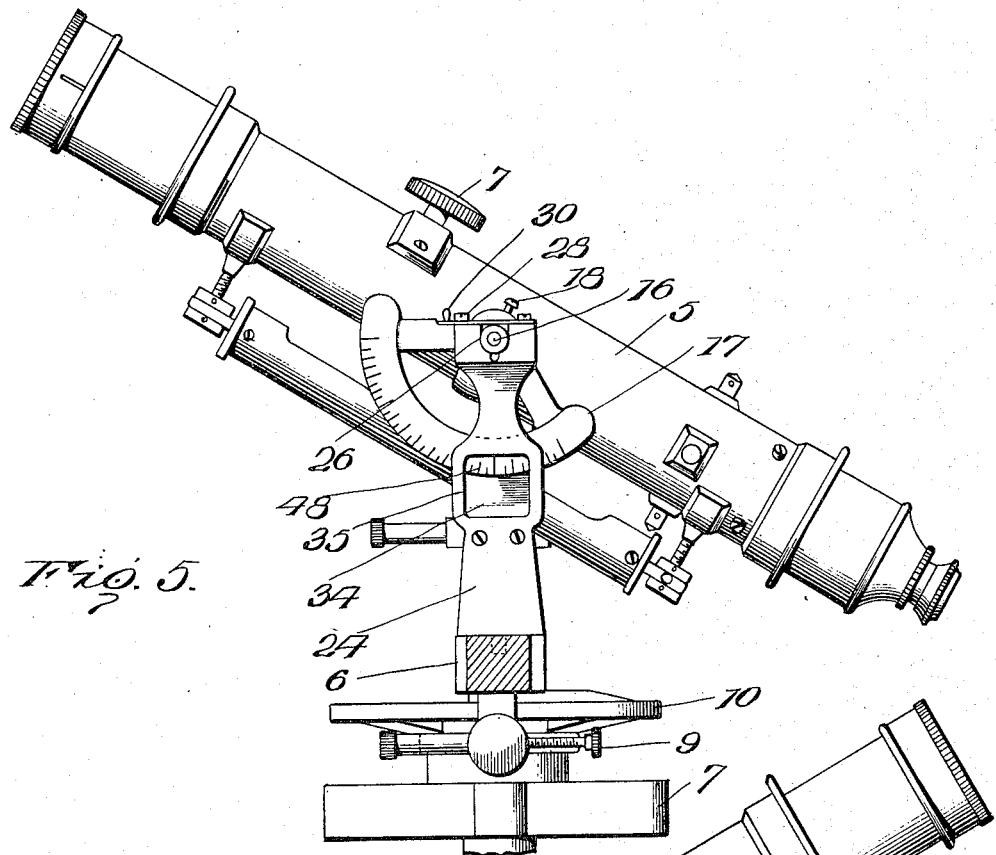
Figure 6:
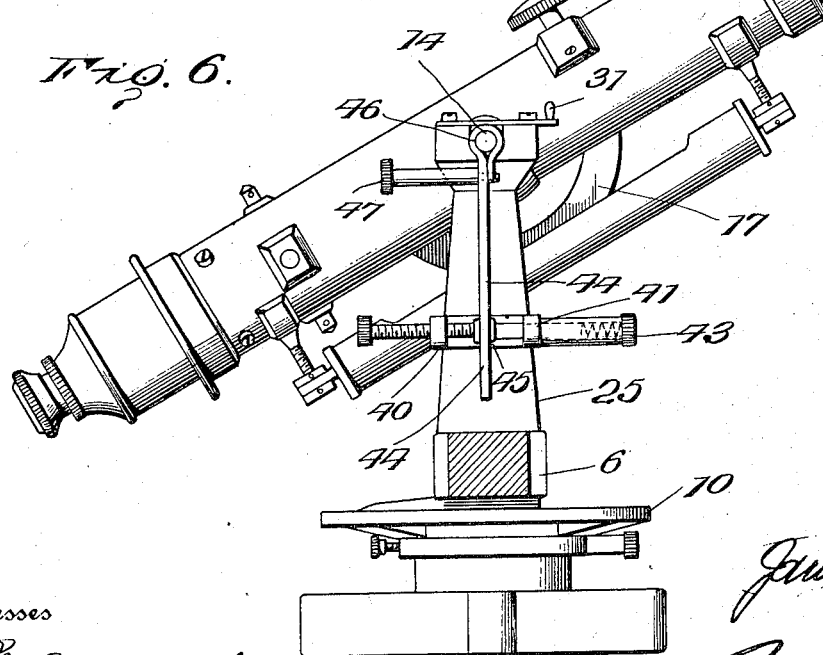

Referring to the drawings forming a part of this specification, wherein similar reference numerals indicate similar parts wherever used, Figure 1 is a side elevation of a level embodying a portion of this invention. Fig. 2 is a top plan view of the same. Fig. 3 is a rear elevation of the level used as a transit by means of the attachment—and Fig. 4 is a perspective view of the attachment used to convert the level into a transit. Fig. 5 is a view from the left side of the instrument in use as a transit. Fig. 6 is a view from the right side of the instrument in use as a transit.

The numeral 5 designates an ordinary type surveyor's or architect's Y level telescope provided with the usual beam 6 and adjusting means 7, 8, and 9, and having the usual circle 10 and corresponding vernier 11. Secured to the level telescope 5 at the longitudinal center thereof is a semi-circular band 12 held in place by means of screws 13. Upon the right side of the telescope the band carries a stepped pivot member 14 made integral with the band 12. Carried by the band 12 upon the left side of the telescope 5 is a pivot member 16 integral with said band and carrying a removable vertical arc 17 held in place on said pivot member by means of a screw 18 and provided with a suitable scale 19 graduated in accordance with the use of the instrument. Provided in the beam 6 are two recesses 20 and 21, and a screw threaded recess 22 intermediate the recesses 20 and 21. When in use as a level the parts added do not interfere with the action thereof.

The attachment used to convert the level into a transit, and illustrated in Fig. 4 comprises a base 23 having upwardly extending arms 24 and 25 terminating in U-shaped members 26 and 27 provided with sockets 28, 29, adapted to be covered by means of several clamps 30, 31, which engage legs 32 and 33 upon the U-shaped members. Secured to the arm 24 is a vernier 34 adapted to be viewed through an aperture 35 in the arm 24. The base 23 carries pins 36 and 37 and an intermediate threaded set screw 38. The right arm 25 carries a U-shaped extension 39 provided with bearing members 40 and 41. The bearing 40 is screw threaded and carries a tangent set screw rod 42 which acts against a spring contained within a casing 43. Mounted upon the rod 42 is an upright member 44 having a slot 45 therein through which the rod 42 passes, giving the rod 44 a slight up and down movement allowing of its being easily attached and detached from the pivot of the telescope axis. The member 44 has a split ring 46 at its upper end, the size of which is governed by means of a set screw 47.

The operation of the device is as follows:—When used as a level the device is placed as shown in Figs. 1 and 2 as an ordinary Y level. When it is desired to use the instrument as a transit the level is removed from its supports and the U standard with the transit attachment, Fig. 4, placed on the beam 6 in such a manner that the pins 36, 37 engage the recesses 20, 21. The set screw 38 is now screwed tightly into the threaded recess 22. The telescope 5 is now placed in position, the pivot 16 being placed within the socket 28 and the socket 29 receiving the pivot 14. The swivel clamps 30, 31, are placed in position engaging the lugs 32, 33, thus forming a housing for the pivots 14, 16. The split eye 46 is swung up and tightened over the pivot 14 by means of the set screw 47. Angular adjustment of the instrument may be then accomplished by means of the tangent screw 42 as in the ordinary transit attachment. The readings for the angles may be ascertained upon the arc 19 in connection with the vernier 34 both of which are visible through the apertures 35 and the scales of which coincide at 48 as shown. In this position the device is a transit suitable for all transit uses.

Considerable variation from the details as herein described may be practised without departing from the spirit of my invention, and it is intended to construe the claims not only in the light of the foregoing, but as broadly as the state of the prior art will permit.

What I claim as new and desire to secure by United States Letters Patent, is:—

1. In a convertible Y level, the combination with a telescope, of a band secured thereto, pivots carried by said band, a vertical arc carried by one of said pivots, means for holding said vertical arc in position upon said pivot and means for supporting said telescope adapted to coöperate with said pivots.

2. In a surveyor's instrument, the combination with a level telescope, of means for supporting the telescope, said means comprising a base, arms one of which is provided with an aperture on said base and extending upwardly therefrom, said arms having U-shaped members provided with sockets, means on said telescope adapted to engage said sockets, swivel clamps adapted to close said sockets, and a vernier carried by one of said arms adapted to be viewed through said aperture.

3. In a surveyor's instrument, the combination with a level telescope, of means for supporting the telescope, said means comprising a base, arms one of which is provided with an aperture on said base and extending upwardly therefrom, said arms having U-shaped members provided with sockets, means on said telescope adapted to engage said support, said means comprising a band secured to said telescope, pivots formed integral with said band and adapted to engage said sockets, swivel clamps adapted to close said sockets, a vernier carried by one of said arms and adapted to be viewed through said aperture.

4. In a surveyor's instrument, the combination with a level telescope, of means for supporting the telescope, said means comprising a base, arms on said base and extending upwardly therefrom, said arms having U-shaped members provided with sockets, means on said telescope coöperating with said support, said means comprising a band secured to said telescope, pivots formed integral with said band and adapted to engage said sockets, swivel clamps adapted to close said sockets, a vernier on one of said arms, a vertical arc carried by one of said pivots and adapted to coöperate with the vernier for the purpose of determining the vertical angle.

5. In a combined level and detachable transit, the combination with a revoluble platform of a level telescope, means detachably secured to said platform adapted to support the level telescope, said means comprising a U-shaped member having sockets in its upper extremities, pivots on said telescope coöperating with said sockets, means for adjusting the telescope in such position, and means for determining the transit angles.

6. In a combined level and detachable transit, the combination with a revoluble platform of a telescope, means detachably secured to said platform adapted to support the level telescope, said means comprising a U-shaped member having sockets in its upper extremities, pivots on said telescope coöperating with said sockets, means for adjusting the telescope in such position, and detachable means for determining the transit angles.

In testimony whereof I have signed my name to this specification in the presence of two subscribing witnesses.

JAMES GEIER.

Witnesses:
   RASMUS NIELSEN,
   THOS. A. FOX.